US009253525B2

(12) United States Patent
Peng

(10) Patent No.: US 9,253,525 B2
(45) Date of Patent: Feb. 2, 2016

(54) METHOD FOR AUDIO-VIDEO RE-MATCHING OF TV PROGRAMS ON MOBILE TERMINAL, AND MOBILE TERMINAL

(75) Inventor: Keshan Peng, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 34 days.

(21) Appl. No.: 14/348,537

(22) PCT Filed: Jan. 16, 2012

(86) PCT No.: PCT/CN2012/070407
§ 371 (c)(1),
(2), (4) Date: Mar. 28, 2014

(87) PCT Pub. No.: WO2013/086792
PCT Pub. Date: Jun. 20, 2013

(65) Prior Publication Data
US 2014/0245363 A1  Aug. 28, 2014

(30) Foreign Application Priority Data
Dec. 12, 2011  (CN) .......................... 2011 1 0412157

(51) Int. Cl.
*H04N 21/43* (2011.01)
*H04N 21/439* (2011.01)
(Continued)

(52) U.S. Cl.
CPC ....... *H04N 21/4307* (2013.01); *H04N 21/4126* (2013.01); *H04N 21/41407* (2013.01);
(Continued)

(58) Field of Classification Search
None
See application file for complete search history.

(56) References Cited

U.S. PATENT DOCUMENTS 6,630,963 B1 * 10/2003 Billmaier ...................... 348/485
6,710,815 B1   3/2004 Billmaier
(Continued)

FOREIGN PATENT DOCUMENTS

CN  1841947 A   10/2006
CN  101056413 A  10/2007
(Continued)

OTHER PUBLICATIONS

International Search Report in international application No. PCT/CN2012/070407, mailed on Sep. 20, 2012.
(Continued)

*Primary Examiner* — Ricky Chin
(74) *Attorney, Agent, or Firm* — Neifeld IP Law, PC

(57) ABSTRACT

The disclosure discloses a method for audio-video re-matching of TV programs on a mobile terminal, including that: when a mobile terminal receives from a user a request to perform re-matching on a current program, the mobile terminal determines whether the user requires to re-match the current program with a new audio; when the mobile terminal determines that the user requires to re-match the current program with a new audio, the mobile terminal stops playing an audio of the current program, acquires target information called for by the user, and outputs a target audio included in the target information and a video of the current program respectively to a corresponding local playing module so as to be played. The disclosure further discloses a corresponding mobile terminal. With the present disclosure, a user can flexibly re-match a program currently being played with a video or an audio, and form a custom program by mixing an audio of a program with a video of another program, thereby obtaining maximal amount of information.

6 Claims, 2 Drawing Sheets

(51) Int. Cl.
  *H04N 21/414* (2011.01)
  *H04N 21/41* (2011.01)
  *H04N 21/472* (2011.01)
  *H04N 21/482* (2011.01)
  *H04N 21/81* (2011.01)

(52) U.S. Cl.
  CPC ....... *H04N 21/4302* (2013.01); *H04N 21/4305* (2013.01); *H04N 21/439* (2013.01); *H04N 21/4398* (2013.01); *H04N 21/472* (2013.01); *H04N 21/482* (2013.01); *H04N 21/8106* (2013.01)

(56) References Cited

U.S. PATENT DOCUMENTS

| | | | | |
|---|---|---|---|---|
| 7,636,126 | B2 * | 12/2009 | Mallinson | 348/515 |
| 8,640,181 | B1 * | 1/2014 | Inzerillo | 725/131 |
| 9,013,632 | B2 * | 4/2015 | Yao | 348/515 |
| 2002/0057380 | A1 | 5/2002 | Matey | |
| 2007/0288954 | A1 | 12/2007 | Chung | |
| 2008/0043964 | A1 * | 2/2008 | Majors et al. | 379/202.01 |
| 2010/0295993 | A1 * | 11/2010 | Oh | 348/516 |
| 2011/0239119 | A1 * | 9/2011 | Phillips et al. | 715/731 |

FOREIGN PATENT DOCUMENTS

| | | |
|---|---|---|
| CN | 101883267 A | 11/2010 |
| EP | 1168692 A1 | 1/2002 |
| WO | 02060178 A1 | 8/2002 |

OTHER PUBLICATIONS

English Translation of the Written Opinion of the International Search Authority in international application No. PCT/CN2012/070407, mailed on Sep. 20, 2012.

Supplementary European Search Report in European application No. 12858577.5, mailed on Mar. 30, 2015.

\* cited by examiner

METHOD FOR AUDIO-VIDEO RE-MATCHING OF TV PROGRAMS ON MOBILE TERMINAL, AND MOBILE TERMINAL

TECHNICAL FIELD

The present disclosure relates to the field of mobile terminal techniques, and in particular to a method for audio-video re-matching of TV programs on a mobile terminal, and a mobile terminal.

BACKGROUND

With the development of science and technology, a television (TV) service has been extensively applied in various electronic products. In recent years, a television service on a mobile terminal, such as China Mobile Multimedia Broadcasting (CMMB), Digital Video Broadcasting-Handheld (DVB-H), Satellite Digital Multimedia Broadcasting (S-DMB), has become a new selling point of the mobile terminal gradually. The popularity of the television service on a mobile terminal mainly comes from the fact that a user may be freed from various restrictions of a traditional television by watching a television program such as one on sports, entertainment, news, and the like conveniently with a mobile terminal.

When a user watches a television program on a mobile terminal, a network platform will provide complete information on an audio and a video of the TV program. However, sometimes the user desires to receive only information on the video (or audio) of one program, and to receive at the same time information on the audio (or video) of another program. For example, when watching a sports program, the user may desire to watch only scenes of a great game, and at the same time to listen to an audio from a music channel. With existing techniques, a program can only be muted, and can not be matched with any other audio by incorporating an audio from another program.

The existing techniques also provide a solution of embedded displaying, wherein complete information on the audio and video of a program is presented in a primary displaying area of a mobile terminal, and the video of another program is shown in a secondary displaying area; although the solution may provide multiple programs for a user at the same time, it cannot re-match a current program with a new audio/video. In addition, the solution requires use of two modulators and two demodulators, and applies only to a mobile terminal with a large screen, thereby causing a problem such as high cost, difficulty in popularization.

SUMMARY

It is desired that embodiments of the disclosure provide a method for audio-video re-matching of TV programs on a mobile terminal as well as a mobile terminal, capable of re-matching a TV program being watched by a user of a mobile terminal with a new audio/video.

A technical solution of the present disclosure is implemented as follows.

Embodiments of the present disclosure propose a method for audio-video re-matching of television programs on a mobile terminal, including the steps of:

when a mobile terminal receives from a user a request to perform re-matching on a current program, determining, by the mobile terminal, whether the user requires to re-match the current program with a new audio; and when the mobile terminal determines that the user requires to re-match the current program with a new audio, stopping playing, by the mobile terminal, an audio of the current program, acquiring, by the mobile terminal, target information called for by the user, and outputting, by the mobile terminal, a target audio included in the target information and a video of the current program respectively to a corresponding local playing module so as to be played.

In an embodiment, the request to perform re-matching on a current program may include a type of information of which re-matching is required by the user and an address of the target information called for by the user, and the type of information may include an audio and a video.

In an embodiment, when the user requires to re-match the current program with a new video, the mobile terminal may stop playing the video of the current program, acquire target information called for by the user, and output a target video included in the target information and the audio of the current program respectively to the corresponding local playing module so as to be played.

In an embodiment, the mobile terminal may acquire the target information called for by the user by determining, by the mobile terminal, whether the target information called for by the user is located locally at the mobile terminal; when the target information is located locally, acquiring, by the mobile terminal, the target information called for by the user locally from the mobile terminal according to the address of the target information; otherwise when the target information is not located locally, further determining, by the mobile terminal, whether the target information called for by the user is located on a network platform; when the target information is located on a network platform, performing, by the mobile terminal, mutual authentication with the network platform, and acquiring, by the mobile terminal, the target information called for by the user from the network platform.

In an embodiment, the mobile terminal may acquire the target information called for by the user from the network platform by sending, by the mobile terminal, the network platform a calling request calling for a target channel corresponding to the address of the target information;

receiving, by the mobile terminal, an encrypted program stream corresponding to the target channel and an encrypted program key corresponding to the encrypted program stream sent by the network platform after the network platform receives the calling request; and acquiring, by the mobile terminal, a program key by decrypting the encrypted program key using a locally pre-stored service key, and then acquiring, by the mobile terminal, the target information called for by the user by decrypting the encrypted program stream using the program key.

Alternatively, in an embodiment, the mobile terminal may acquire the target information called for by the user from the network platform by sending, by the mobile terminal, the network platform a calling request calling for a target channel corresponding to the address of the target information;

receiving, by the mobile terminal, an encrypted program stream corresponding to the target channel and a copyright object corresponding to the encrypted program stream sent by the network platform after the network platform receives the calling request; and acquiring, by the mobile terminal, the target information called for by the user by decrypting the encrypted program stream using the copyright object.

In an embodiment, the method may further include the step(s) of when the mobile terminal receives from the user a request for resuming playing the current program, stopping calling for, by the mobile terminal, the target information called for by the user, and outputting, by the mobile terminal, the audio of and the video of the current program respectively to the corresponding local playing module so as to be played.

In an embodiment, the method may further include the step(s) of: after the step of outputting, by the mobile terminal, a target audio included in the target information and a video of the current program respectively to a corresponding local playing module so as to be played, locally saving, by the mobile terminal, the target audio included in the target information and the video of the current program being played as a custom program.

In an embodiment, the method may further include the step(s) of: after the outputting, by the mobile terminal, a target video included in the target information and the audio of the current program respectively to the corresponding local playing module so as to be played, locally saving, by the mobile terminal, the target video included in the target information and the audio of the current program being played as a custom program.

The disclosure further proposes a mobile terminal configured to: when receiving from a user a request to perform re-matching on a current program, determine whether the user requires to re-match the current program with a new audio; and when the mobile terminal determines that the user requires to re-match the current program with a new audio, stop playing an audio of the current program, acquire target information called for by the user, and output a target audio included in the target information and a video of the current program respectively to a corresponding local playing module so as to be played.

In an embodiment, the mobile terminal may specifically include: a user-request receiving module, a re-matching-type determining module, a hybrid-program playing module, a hybrid-program saving module, a current program resuming module, an audio playing module and a video playing module, wherein the user-request receiving module may be configured to receive from the user the request for re-matching the current program with a new audio/video;

the re-matching-type determining module may be configured to determine a type of information with which the user requires to re-match the current program, the type of information including an audio and a video;

the hybrid-program playing module may be configured to acquire the target information called for by the user, and when the user requires to re-match the current program with a new audio, output the the target audio included in the target information and the video of the current program respectively to the audio playing module and the video playing module;

the hybrid-program saving module may be configured to locally save the target audio and the video of the current program being played as a custom program;

the current program resuming module may be configured to: when the mobile terminal receives from the user a request for resuming playing the current program, stop calling for the target information called for by the user, and output the audio of and the video of the current program respectively to the audio playing module and the video playing module;

the audio playing module may be configured to play a received audio through a corresponding speaker of the mobile terminal; and the video playing module may be configured to play a received video through a corresponding display of the mobile terminal.

In an embodiment, the hybrid-program playing module may be further configured to: when the user requires to re-match the current program with a new video, output a target video included in the target information and the audio of the current program respectively to the video playing module and the audio playing module; and the hybrid-program saving module may be further configured to locally save the target video and the audio of the current program being played as a custom program.

Compared with the existing techniques, embodiments of the present disclosure have the following advantageous effects: when running a television application on a mobile terminal, a user can flexibly re-match a program currently being played with a video or an audio, and form a custom program by mixing an audio of a program with a video of another program, such that the user may obtain maximal amount of information while watching a favorite television program.

DETAILED DESCRIPTION

To clearly show a technical solution and an advantageous effect of the disclosure, the present disclosure will be further elaborated below with reference to accompanying drawings and embodiments. It should be understood that specific embodiments described here are merely for explaining the present disclosure, and are not intended to limit the present disclosure.

Figure 1:
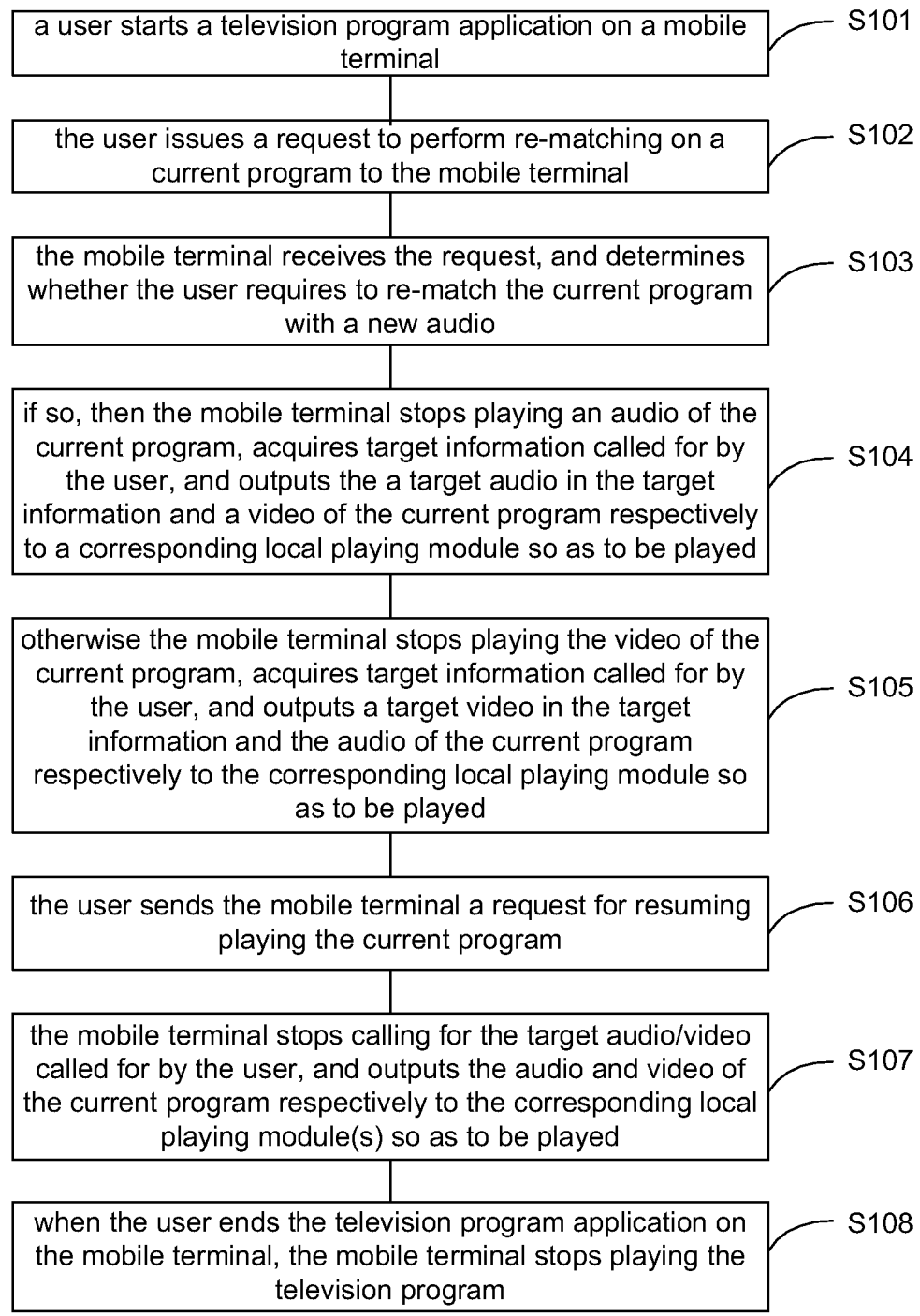
FIG. 1 is a flow chart of a method for audio-video re-matching of television programs on a mobile terminal in an embodiment of the present disclosure.

FIG. 1 is a flow chart of a method for audio-video re-matching of television programs on a mobile terminal in an embodiment of the present disclosure. As shown in FIG. 1, the method of the embodiment includes steps as follows.

step S101, a user starts a television program application on a mobile terminal;

step S102, the user issues a request to perform re-matching on a current program to the mobile terminal;

the request to perform re-matching on a current program may include a type of information of which re-matching is required by the user and an address of the target information called for by the user, the type of information includes an audio and a video.

When the user watches a television program on the mobile terminal, the mobile terminal plays the complete audio and video of the current program by default. When the user is uninterested in the audio or video of the current program, the user may issue the request to perform re-matching on the current program to the mobile terminal. For example, when the user is uninterested in the audio of the current program such as CCTV5, the user may issue the request to perform re-matching on the current program, including in the request that the type of information of which re-matching is required is "audio" and the address is that of the target information provided by the user. The address may be located locally at the mobile terminal, or on a network platform.

Step S103, the mobile terminal receives the request, and determines whether the user requires to re-match the current program with a new audio;

the mobile terminal determines whether the user requires to re-match the current program with a new audio according to the type of information of which re-matching is required by the user included in the request.

Step S104, if so, then the mobile terminal stops playing an audio of the current program, acquires target information called for by the user, and outputs the a target audio in the target information and a video of the current program respectively to a corresponding local playing module so as to be played;

The mobile terminal may stop playing the audio of the current program by stopping outputting the audio of the current program to an audio playing module. The mobile terminal may acquire the target information called for by the user by determining whether the target information called for by the user is located locally at the mobile terminal, if so, then acquiring the target information called for by the user locally from the mobile terminal according to the address of the target information, otherwise determining whether the target information called for by the user is located on a network platform, if so, then performing mutual authentication with the network platform, and acquiring the target information called for by the user from the network platform.

A mobile terminal with a type of television service "CMMB" acquires the target information called for by the user from the network platform by sending the network platform a calling request calling for a target channel corresponding to the address of the target information; and receiving an encrypted program stream corresponding to the target channel and an encrypted program key corresponding to the encrypted program stream sent by the network platform after the network platform receives the calling request; and acquiring a program key by decrypting the encrypted program key using a locally pre-stored service key, and then acquiring the target information called for by the user by decrypting the encrypted program stream using the program key.

A mobile terminal with a type of television service "DVB-H" acquires the target information called for by the user from the network platform by sending the network platform a calling request calling for a target channel corresponding to the address of the target information;

receiving an encrypted program stream corresponding to the target channel and a copyright object corresponding to the encrypted program stream sent by the network platform after the network platform receives the calling request;

acquiring the target information called for by the user by decrypting the encrypted program stream using the copyright object.

In the step S104, after outputting the target audio included in the target information and the video of the current program respectively to the corresponding local playing module(s) so as to be played, the mobile terminal may also locally save the the target audio and the video of the current program being played as a custom program according to user requirement.

Step S105, otherwise the mobile terminal stops playing the video of the current program, acquires target information called for by the user, and outputs a target video in the target information and the audio of the current program respectively to the corresponding local playing module so as to be played;

In the step S105, after outputting the target video included in the target information and the audio of the current program respectively to the corresponding local playing module(s) so as to be played, the mobile terminal may also locally save the target video and the audio of the current program being played as a custom program according to user requirement.

Step S106, the user sends the mobile terminal a request for resuming playing the current program;

When the user needs to resume the original audio and video of the current program, the user may send the request for resuming playing the current program to the mobile terminal.

Step S107, the mobile terminal stops calling for the target audio/video called for by the user, and outputs the audio and video of the current program respectively to the corresponding local playing module(s) so as to be played.

Step S108, when the user ends the television program application on the mobile terminal, the mobile terminal stops playing the television program.

Figure 2:
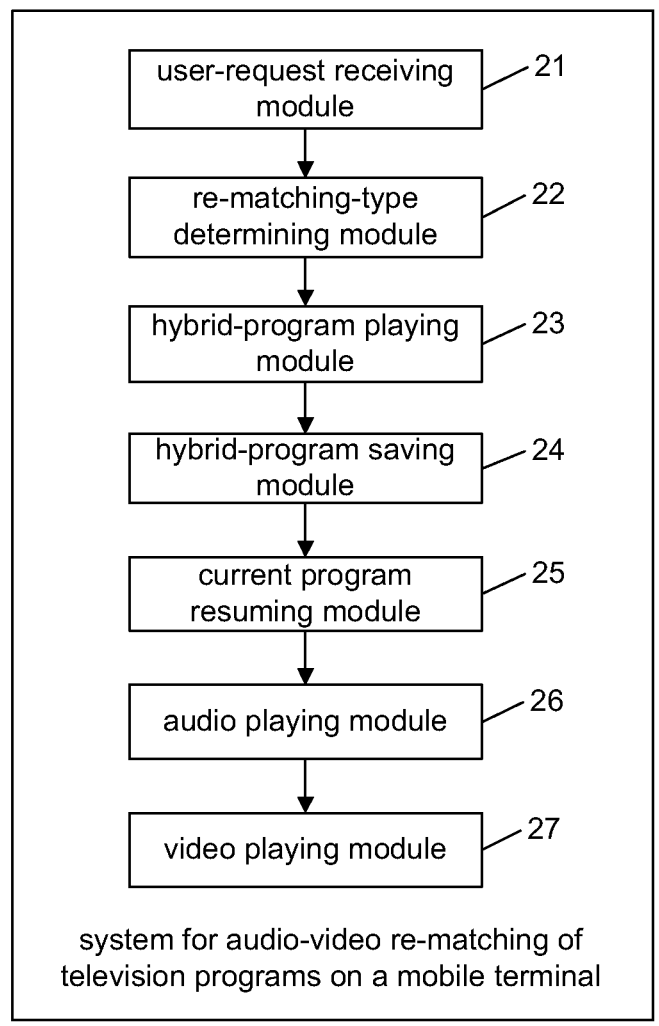
FIG. 2 is a block diagram of modules in a mobile terminal in an embodiment of the present disclosure.

FIG. 2 is a block diagram of modules in a mobile terminal in an embodiment of the present disclosure. As shown in FIG. 2, the mobile terminal in the embodiment includes: a user-request receiving module 21, a re-matching-type determining module 22, a hybrid-program playing module 23, a hybrid-program saving module 24, a current program resuming module 25, an audio playing module 26 and a video playing module 27.

The mobile terminal is configured to: when receiving from a user a request to perform re-matching on a current program, determine whether the user requires to re-match the current program with a new audio; if so, then stop playing an audio of the current program, acquire target information called for by the user, and output a target audio included in the target information and a video of the current program respectively to a corresponding local playing module so as to be played.

The user-request receiving module 21 is configured to receive from the user the request for re-matching the current program with a new audio/video.

The re-matching-type determining module 22 is configured to determine a type of information with which the user requires to re-match the current program, the type of information including an audio and a video.

The hybrid-program playing module 23 is configured to acquire the target information called for by the user, and when the user requires to re-match the current program with a new audio, output the the target audio included in the target information and the video of the current program respectively to the audio playing module and the video playing module, or when the user requires to re-match the current program with a new video, output a target video included in the target information and the audio of the current program respectively to the video playing module and the audio playing module.

The hybrid-program saving module 24 is configured to locally save the the target audio included in the target information and the video of the current program being played as a custom program, or locally save the target video included in the target information and the audio of the current program being played as a custom program.

The current program resuming module 25 is configured to: when the mobile terminal receives from the user a request for resuming playing the current program, stop calling for the target information called for by the user, and output the audio of and the video of the current program respectively to the audio playing module and the video playing module.

The audio playing module 26 is configured to play a received audio through a corresponding speaker of the mobile terminal.

The video playing module 27 is configured to play a received video through a corresponding display of the mobile terminal.

The above description illustrates and describes embodiments of the present disclosure, however as mentioned above, it should be understood that the present disclosure is not limited to the forms disclosed herein; the forms should not be construed as exclusion of other embodiments, but may apply to various other combinations, modifications and contexts, and can be altered according to the above teaching or techniques or knowledge in related art within the scope of the present disclosure. Any modification or alteration made by the skilled in the art without departing form the spirit and scope of the present disclosure should fall in the protection scope of the appended claims of the present disclosure.

The invention claimed is:

1. A method for audio-video re-matching of television programs on a mobile terminal, comprising:
when a mobile terminal receives from a user a request to perform re-matching on a current program, determining, by the mobile terminal, whether the user requires to re-match the current program with a new audio; and
when the mobile terminal determines that the user requires to re-match the current program with a new audio, stopping playing, by the mobile terminal, an audio of the current program, acquiring, by the mobile terminal, target information called for by the user, and outputting, by the mobile terminal, a target audio included in the target information and a video of the current program respectively to a corresponding local playing module so as to be played,
wherein the request to perform re-matching on a current program comprises a type of information of which re-matching is required by the user and an address of the target information called for by the user, the type of information comprising an audio and a video,
wherein the method further comprises:
when the mobile terminal determines that the user requires to re-match the current program with a new video, stopping playing, by the mobile terminal, the video of the current program, acquiring, by the mobile terminal, target information called for by the user, and outputting, by the mobile terminal, a target video included in the target information and the audio of the current program respectively to the corresponding local playing module so as to be played;
when the mobile terminal receives from the user a request for resuming playing the current program, stopping calling for, by the mobile terminal, the target information called for by the user, and outputting, by the mobile terminal, the audio of and the video of the current program respectively to the corresponding local playing module so as to be played,
wherein the acquiring, by the mobile terminal, target information called for by the user is:
determining, by the mobile terminal, whether the target information called for by the user is located at the mobile terminal; when the target information is located at the mobile terminal, acquiring, by the mobile terminal, the target information called for by the user from the mobile terminal according to the address of the target information; otherwise when the target information is not located at the mobile terminal,
further determining, by the mobile terminal, whether the target information called for by the user is located on a network platform; when the target information is located on a network platform, performing, by the mobile terminal, mutual authentication with the network platform, and acquiring, by the mobile terminal, the target information called for by the user from the network platform,
wherein the method further comprises: saving, by the mobile terminal, the target audio and the video of the current program being played as a custom program at the mobile terminal.

2. The method according to claim 1, wherein the acquiring, by the mobile terminal, the target information called for by the user from the network platform is:
sending, by the mobile terminal, the network platform a calling request calling for a target channel corresponding to the address of the target information;
receiving, by the mobile terminal, an encrypted program stream corresponding to the target channel and an encrypted program key corresponding to the encrypted program stream sent by the network platform after the network platform receives the calling request; and
acquiring, by the mobile terminal, a program key by decrypting the encrypted program key using a service key pre-stored at the mobile terminal, and then acquiring, by the mobile terminal, the target information called for by the user by decrypting the encrypted program stream using the program key.

3. The method according to claim 1, wherein the acquiring, by the mobile terminal, the target information called for by the user from the network platform is:
sending, by the mobile terminal, the network platform a calling request calling for a target channel corresponding to the address of the target information;
receiving, by the mobile terminal, an encrypted program stream corresponding to the target channel and a copyright object corresponding to the encrypted program stream sent by the network platform after the network platform receives the calling request; and
acquiring, by the mobile terminal, the target information called for by the user by decrypting the encrypted program stream using the copyright object.

4. The method according to claim 1, wherein the saving, by the mobile terminal, the target audio and the video of the current program being played as a custom program at the mobile terminal is performed after the outputting, by the mobile terminal, a target audio included in the target information and a video of the current program respectively to a corresponding local playing module so as to be played.

5. The method according to claim 1, further comprising: after the outputting, by the mobile terminal, a target video included in the target information and the audio of the current program respectively to the corresponding local playing module so as to be played,
saving, by the mobile terminal, the target video included in the target information and the audio of the current program being played as a custom program at the mobile terminal.

6. A mobile terminal, wherein when receiving from a user a request to perform re-matching on a current program, the mobile terminal determines whether the user requires to re-match the current program with a new audio; and
when the mobile terminal determines that the user requires to re-match the current program with a new audio, the mobile terminal stops playing an audio of the current program, acquires target information called for by the user, and outputs a target audio included in the target information and a video of the current program respectively to a corresponding local playing module so as to be played, wherein the mobile terminal comprises: a user-request receiving module, a re-matching-type determining module, a hybrid-program playing module, a current program resuming module, an audio playing module and a video playing module wherein each module comprises circuitry for executing software in a memory of the mobile terminal, wherein the user-request receiving module is configured to receive from the user the request for re-matching the current program with a new audio or video;

the re-matching-type determining module is configured to determine a type of information with which the user requires to re-match the current program, wherein the request to perform re-matching on a current program comprises the type of information of which re-matching is required by the user and an address of the target information called for by the user, the type of information comprising an audio and a video;

the hybrid-program playing module is configured to acquire the target information called for by the user, and when the user requires to re-match the current program with a new audio, output the target audio included in the target information and the video of the current program respectively to the audio playing module and the video playing module;

the current program resuming module is configured to: when the mobile terminal receives from the user a request for resuming playing the current program, stop calling for the target information called for by the user, and output the audio of and the video of the current program respectively to the audio playing module and the video playing module;

the audio playing module is configured to play a received audio through a corresponding speaker of the mobile terminal; and the video playing module is configured to play a received video through a corresponding display of the mobile terminal, wherein the hybrid-program playing module is further configured to: when the user requires to re-match the current program with a new video, output a target video included in the target information and the audio of the current program respectively to the video playing module and the audio playing module, wherein the mobile terminal is configured for: determining whether the target information called for by the user is located at the mobile terminal; when the target information is located at the mobile terminal, acquiring the target information called for by the user from the mobile terminal according to the address of the target information; otherwise when the target information is not located at the mobile terminal, further determining whether the target information called for by the user is located on a network platform; when the target information is located on a network platform, performing mutual authentication with the network platform, and acquiring the target information called for by the user from the network platform, wherein the mobile terminal comprises a hybrid-program saving module having circuitry configured to save the target audio and the video of the current program being played as a custom program at the mobile terminal.

* * * * *